United States Patent [19]

Mitchell et al.

[11] Patent Number: 5,021,373

[45] Date of Patent: Jun. 4, 1991

[54] POROUS CORDIERITE COMPOSITIONS WITH IMPROVED THERMAL EXPANSION CHARACTERISTICS

[75] Inventors: Robert L. Mitchell, Atlanta; Frank R. Rhodes, Jr., Doraville, both of Ga.

[73] Assignee: Applied Ceramics, Inc., Doravilla, Ga.

[21] Appl. No.: 487,659

[22] Filed: Mar. 2, 1990

[51] Int. Cl.$^5$ ...................... C04B 35/18; C04B 35/20
[52] U.S. Cl. .................................. 501/119; 501/128; 501/118
[58] Field of Search ................ 501/118, 119, 120, 128

[56] References Cited

U.S. PATENT DOCUMENTS

| | | | |
|---|---|---|---|
| 4,385,129 | 5/1983 | Inoguchi et al. | 501/118 |
| 4,403,017 | 4/1983 | Bind | 501/119 X |
| 4,435,512 | 3/1984 | Ito et al. | 501/118 X |
| 4,476,236 | 10/1984 | Inoguchi et al. | 501/119 X |
| 4,587,067 | 5/1986 | Agrawal et al. | 501/119 X |
| 4,631,267 | 12/1986 | Lachman et al. | |
| 4,631,268 | 12/1986 | Lachman et al. | |
| 4,631,269 | 12/1986 | Lachman et al. | |
| 4,637,995 | 1/1987 | DeAngelis et al. | |
| 4,657,880 | 4/1987 | Lachman et al. | |

OTHER PUBLICATIONS

D. K. Agrawal; "Germanium-Modified Cordierite Ceramics with Low Thermal Expansion"; *Journal of the American Ceramic Society*; vol. 69, No. 12, Dec. 1986.

*Primary Examiner*—Karl Group
*Attorney, Agent, or Firm*—Jones, Askew & Lunsford

[57] ABSTRACT

Cordierite compositions having increased porosity and improved thermal expansion characteristics are disclosed. The cordierite compositions comprise from about 0.025 to about 1.5 percent by weight germanium dioxide and exhibit reduced CTE. The cordierite compositions are made by heating a mixture of kaolin, talc, alumina, kyanite and germanium dioxide to temperatures of between 1350° and 1475°C. The cordierite compositions are preferably made from a mixture which includes a calcined material, such as calcined talc, so that the mixture is more easily processed and the resulting cordierite compositions are more porous, and thus, more easily coated.

10 Claims, No Drawings

POROUS CORDIERITE COMPOSITIONS WITH IMPROVED THERMAL EXPANSION CHARACTERISTICS

TECHNICAL FIELD

This invention relates generally to ceramic materials, and more particularly relates to cordierite compositions which are porous and have improved thermal expansion characteristics.

BACKGROUND OF THE INVENTION

Cordierite is a ceramic material which possesses a relatively low coefficient of thermal expansion (CTE) and a high resistance to thermal shock. Substantially pure cordierite typically has a CTE of less than $1.8 \times 10^{-6}$ in./in./°C. over a range of 20° C.–1000° C. These thermal expansion characteristics make cordierite useful in high temperature applications. For example, cordierite has commonly been used to make cookware, dinnerware, catalyst substrates, molten metal filters, mirror substrates for laser systems, and other articles which must withstand rapid changes in temperatures. Despite these favorable thermal expansion characteristics, the CTE of pure cordierite is still too high for some applications, such as mirror substrates for laser systems, catalytic substrates, molten metal filters and the like. For example, most automobile manufacturers require automotive catalytic converter substrates to have a CTE of less than $1.25 \times 10^{-6}$ in./in./°C.

Cordierite compositions having a lower CTE have been developed. For example, anisotropic cordierite compositions made from raw platelet type clay have a reduced CTE which allows them to meet automobile manufacturers' standards of CTE for catalytic converter substrates. However, these cordierite compositions have low and inconsistent porosity which causes difficulties in the application of catalytic coatings to catalytic substrates. In addition, cordierite compositions containing germanium dioxide have a greatly reduced CTE which is substantially zero between room temperature and a selected second temperature up to 400° C. However, these cordierite compositions are not suitable for use as catalytic substrates because of the high cost of germanium dioxide at the percentages contained in these compositions.

Anisotropic cordierite compositions are disclosed in U.S. Pat. No. 3,885,977 (hereinafter "the '977 patent"). According to the '977 patent, cordierite compositions having a CTE which is reduced and different directionally in the composition can be produced by selecting raw clays which are in platelet form or which can be broken down into platelet form, mixing the clay with other appropriate raw materials, properly orienting the clay platelets in the mixture, and firing the mixture to form cordierite. These cordierite compositions are described as having a CTE in the axial direction of as low as $0.55 \times 10^{-6}$ in./in./°C. and $1.1 \times 10^{-6}$ in other directions which is less than that required by most automobile manufactures. However, as stated hereinabove, the cordierite compositions produced according to the '977 patent are relatively low in porosity. Catalytic substrates are typically coated with a precious metal catalyst coating. This coating normally consists of a gamma alumina wash coat followed by the application of a coating of precious metal such as platinum. It is more difficult to apply such a coating to less porous cordierite compositions than to more porous cordierite compositions.

U.S. Pat. No. 4,403,017 (hereinafter "the '017 patent") discloses germanium dioxide modified, high-density, cordierite compositions which are useful to make mirror substrates for laser systems. According to the '017 patent, cordierite has an essentially zero CTE between room temperature and a second selected temperature when a sufficient amount of germanium dioxide is incorporated into the cordierite structure. The temperature at which the CTE of the cordierite becomes zero depends on the concentration of the germanium dioxide in the cordierite. In addition, increasing the concentration of the germanium dioxide in the cordierite increases the temperature at which the CTE of the cordierite becomes zero and reduces the average CTE of the cordierite. The '017 patent teaches that the proper proportion of germanium dioxide in cordierite is a 0.2 to 2 mole substitution of germanium dioxide for silica in the cordierite. This corresponds to a germanium dioxide concentration of about 3.6 to about 27 weight percent in the cordierite. According to the '017 patent, cordierite having a germanium dioxide concentration of greater than 3.6 weight percent has a thermal expansion lower than that of pure cordierite at temperatures greater than 124° C.; however, cordierite having a germanium dioxide concentration of about 3.6 weight percent does not exhibit reduced thermal expansion at temperatures of 120° C. or greater. Instead, the '017 patent shows that the thermal expansion of cordierite with a germanium dioxide concentration of 3.6 weight percent is higher than that of pure cordierite at the same temperatures.

U.S. Pat. No. 4,587,067 (hereinafter "the '067 patent") discloses a method for the production of germanium dioxide modified, high-density, cordierite compositions for use in making mirror substrates for laser systems. According to the '067 patent, the CTE of cordierite can be made substantially zero over selected broad temperature ranges up to 200° C. by substituting 0.1 to 4 moles of germanium dioxide for silica in the cordierite structure. This corresponds to a germanium dioxide concentration of from about 1.8 to about 43 percent by weight in the cordierite. The '067 patent does not show that a concentration of less than 3.6 weight percent germanium dioxide in the cordierite is effective to reduce the thermal expansion of the cordierite at the elevated temperatures. Thus, the prior art teaches that the presence of more than 3.6 weight percent germanium dioxide in cordierite is necessary for the reduction of the thermal expansion of cordierite at temperatures greater than about 124° C.

As provided hereinabove, the CTE of pure cordierite is too high for certain applications. According to the prior art teachings, germanium dioxide must be present in the cordierite in the amount of at least 3.6 weight percent to be effective in reducing the thermal expansion of the cordierite at temperatures greater than about 124° C. Automotive catalytic converter substrates are commonly subjected to temperatures greater than 124° C. Thus, based on the prior art, cordierite with a germanium dioxide concentration of 3.6 weight percent or less would have a CTE too high to meet standards set by automobile manufacturers. Because of the high cost of germanium dioxide, cordierite having more than 3.6 weight percent germanium dioxide is not economical to produce.

There are additional problems in the production of catalytic substrate cordierite compositions. One such problem is that the mixture of raw materials used to make cordierite tends to shrink during drying and firing. If the shrinkage occurs too rapidly, the forming cordierite becomes cracked or distorted. Accordingly, the drying and firing steps of the standard cordierite production process must be conducted slowly. This time consuming process is costly to conduct.

Therefore, there is a need for a cordierite composition having a reduced CTE and a relatively high level of porosity, which can be produced economically. More specifically, there is a need for an economically-produced cordierite composition having a reduced CTE and improved coating characteristics which is useful as a catalytic substrate.

SUMMARY OF THE INVENTION

Accordingly, an object of the present invention is to provide a cordierite composition having improved thermal expansion characteristics and a process for making the same.

Another object of the present invention is to provide a cordierite composition having improved thermal expansion characteristics and which is economical to produce.

Another object of the present invention is to provide a cordierite composition which can be fired in less time and is therefore less expensive to manufacture.

Another object of the present invention is to provide a cordierite composition which has a relatively high level of porosity for ease and consistency in coating and a process for making the same.

Another object of the present invention is to provide a cordierite composition which shrinks little or not at all during firing, and is therefore less expense to manufacture.

A further object of the present invention is to provide a cordierite composition which is useful as a catalytic substrate and a process for making the same.

The present invention fulfils these and other objects by providing a ceramic composition comprising cordierite which includes from about 0.025 to about 1.5 percent, by weight, of germanium dioxide and a method for making such a ceramic composition. The composition of the present invention exhibits surprisingly improved thermal expansion characteristics, such as a lower CTE at higher temperatures and a high resistance to thermal shock. The cordierite compositions of the present invention consistently exhibit a CTE of less than $1.24 \times 10^{-6}$ in./in./°C. Because of the small quantities of germanium dioxide which are found to be effective, the cordierite compositions of the present invention are economically produced and are particularly useful as catalytic substrates.

A preferred embodiment of the ceramic composition of the present invention has germanium dioxide substantially uniformly dispersed throughout the cordierite so that the CTE is substantially uniformly reduced throughout the ceramic structure.

In another aspect, the present invention provides a process for producing ceramic compositions having improved thermal expansion characteristics comprising the steps of providing a substantially dry mixture comprising kaolin clay, talc, alumina, and kyanite, adding germanium dioxide to the substantially dry mixture in an amount from about 0.025 to about 1.5 percent by weight of the substantially dry mixture, adding liquid to the substantially dry mixture to form a wet mixture, forming the wet mixture into a shape, drying the formed shape, and heating the formed and dried shape to a temperature at which sintering occurs and cordierite is formed.

In a preferred embodiment of the process of the present invention, at least one of the group consisting of kaolin, talc, alumina, and kyanite comprises a portion which has been calcined and reduces shrinkage, allowing faster firing cycles, thereby lowering processing costs.

In an even more preferred embodiment of the process of the present invention, the talc provided in the substantially dry mixture comprises calcined talc. Stated more particularly, the talc provided in the substantially dry mixture comprises about 50 percent by weight of calcined talc and about 50 percent by weight of raw talc. The calcined material imparts porosity to the resulting ceramic composition, and reduces shrinkage, allowing faster firing cycles, thereby lowering processing costs. The increased porosity provides a surface which is more easily coated. This aspect of the present invention is particularly advantageous when the ceramic composition of the present invention is used to form a catalytic converter substrate. Coatings, such as precious metals, can be applied to the ceramic compositions of the present invention more easily and more consistently than to more dense ceramic compositions.

In addition, the ceramic composition of the present invention is essentially isotropic unlike standard catalytic substrate cordierite compositions which are typically anisotropic. Thus, the CTE of the ceramic composition of the present invention is essentially the same along all axes. It is believed that the isotropic nature of the ceramic compositions of the present invention is due to the use of calcined materials.

Further, the process provided by the present invention provides some process advantages over conventional processes for producing cordierite compositions. These advantages provide for a more economical cordierite production process. For example, the wet mixture of reactants in the process of the present invention does not shrink upon firing. Although there is some shrinkage during drying of the wet mixture, expansion occurs as the dried mixture is sintered for a small net expansion. In addition, total firing time required in the process of the present invention is significantly less than that of conventional processes for producing cordierite. It is believed that these processing advantages are also due to the use of calcined materials.

Thus, the present invention provides a ceramic composition which is porous for ease and consistency in coating, has a reduced CTE along all axes, and is economically produced.

The nature of the present invention, as well as other objects and advantages thereof, will become more readily apparent from the following description of the preferred embodiment.

DETAILED DESCRIPTION

As set forth hereinabove, the present invention provides a ceramic composition comprising cordierite which includes from about 0.025 to about 1.5 percent, by weight, of germanium dioxide. The ceramic composition of the present invention preferably compromises about 0.1 percent by weight of germanium dioxide. Pure cordierite has the formula $2MgO.2Al_2O_3.5(SiO_2)$ and germanium dioxide has the formula $GeO_2$. It is believed that germanium dioxide is incorporated into the lattice structure of the cordierite with each germanium atom replacing a silicon atom in the lattice structure; however, it should be understood that the exact physical structure of the germanium dioxide modified cordierite of the present invention is not known.

The ceramic composition of the present invention is preferably made by firing a mixture of kaolin clay, talc, alumina, kyanite and germanium dioxide to temperatures between 1350° and 1475° C. At these temperatures, the foregoing mixture sinters and cordierite is formed. As is well known to those of ordinary skill in the art, cordierite can be formed by heating mixtures of the compounds containing magnesium, aluminum, silicon, and oxygen. For example, the '017 patent teaches that cordierite is formed by heating a mixture of magnesium oxide, alumina, and silica. It should be understood that germanium dioxide can be added to such other appropriate raw materials and heated to form germanium dioxide modified cordierite.

The ceramic composition of the present invention is preferably made by providing a dry mixture comprising about 30 percent by weight kaolin clay, about 40 percent by weight talc, about 15 percent by weight alumina, and about 15 percent by weight kyanite. Germanium dioxide is then added to the dry mixture in an amount from about 0.025 to 1.5 percent by weight of the dry mixture. The addition of germanium dioxide reduces the CTE of the cordierite so that the cordierite can withstand rapid and extreme changes in temperatures. Because of the reduced CTE, the ceramic compositions of the present invention can be used in a variety of applications including but not limited to automotive catalytic converter substrates, molten metal filters, industrial catalytic substrates, and diesel engine particulate hydrocarbon emission traps.

The composition of the present invention is preferably made with at least a portion of calcined materials. Preferably, at least a portion of either the kaolin clay, the talc, the alumina, or the kyanite should be calcined prior to being added to the dry mixture. More preferably, at least a portion of the talc is calcined. Most preferably, the talc which forms part of the dry mixture comprises about 50 percent, by weight, of raw talc and about 50 percent, by weight, of calcined talc. The presence of calcined talc provides for a more porous cordierite composition which is more suitable for use in applications such as catalytic substrates. However, it should be understood that variations in the ratio of raw talc to calcined talc may vary depending on the amount of porosity desired in the cordierite composition.

The ceramic composition of the present invention is essentially isotropic and this is believed to be due to the use of calcined materials in the formation of the cordierite. Because the ceramic composition of the present invention is isotropic, the CTE is substantially the same along all axes.

The dry materials, kaolin clay, talc, alumina, kyanite and germanium dioxide are preferably screened prior to mixing to remove coarse particles therefrom to promote homogenization of the mixture and to prevent clogging of extrusion dies used to shape the mixture of materials. In addition, it is important that the dry materials be thoroughly mixed to ensure substantially uniform dispersion of the germanium dioxide throughout the mixture. The uniform distribution of the germanium dioxide provides for a uniform reduction in the CTE throughout the resulting cordierite structure.

Organic binders such as methylcellulose are preferably added to the dry mixture so that the mixture better holds shape and is stronger after wetting, extrusion, and drying.

After the dry materials are thoroughly mixed, liquid is added to the dry materials to form a wet mixture which can be extruded through a die into various shapes. The liquid added to the dry mixture perferably consists primarily of chilled water. The liquid may also include various additives well known to those of ordinary skill in the art which promote wetting of the dry mixture and provide for a more easily extrudable mixture which better holds its shape.

The wet mixture is formed into a shape which will be the shape of the final cordierite structure. The wet mixture may be shaped by passing the wet mixture through an extrusion die or by other processes. A honeycomb-shaped structure is preferred for catalytic substrates. However, it should be understood that the wet mixture can be formed into virtually any shape suitable for the desired application of the resulting cordierite structure.

As mentioned hereinabove, the mixture of raw materials is heated to form cordierite. The shaped wet mixture is dried and then preferably gradually heated to temperatures between 1350° and 1475° C. for a period of time sufficient to sinter the mixture and form cordierite. The length of heating time necessary to completely transform the shaped mixture into cordierite varies depending on the size, composition and shape of the mixture as is well known to those of ordinary skill in the art.

When calcined materials are used to make the ceramic compositions of the present invention, the firing time necessary to sinter the shaped and dried mixture is reduced and is substantially less than the firing time required in processes for firing standard cordierite compositions. Where the talc used comprises about one-half calcined talc and about one-half raw talc, the firing time of the mixture is about one-half of that required in firing standard cordierite compositions. In addition, when calcined materials are used, there is no net shrinkage of the shaped mixture as a result of the drying and firing of the mixture, although there is a slight net expansion. Nevertheless, because there is such a small change in size which occurs during firing, the firing process can proceed more quickly without cracking or distoring the forming cordierite. Thus, cordierite compositions made according to the present invention take less time to fire and are therefore less costly to produce than most standard cordierite compositions.

The following examples are designed to teach those of ordinary skill in the art how to practice this invention and to represent the best mode contemplated for carrying out this invention.

EXAMPLE 1

A 400 cpsi (cells per square inch) honeycomb-shaped cordierite extrusion was made according to the following procedure. 475 g of raw delaminated kaolin, 275 g of calcined kaolin, 500 g of raw ceramic grade steatite talc, 500 g of calcined ceramic grade steatite talc, 375 g of calcined alpha alumina, 375 g of calcind kyanite, and 70 g of methylcellulose were passed through an 80 mesh screen, placed in a large planetary action mixer and blended for 15 minutes using a standard open paddle mixing attachment. 500 g of this mixture were removed and placed in a small planetary action mixer where 1.25 g of electronic grade germanium dioxide were added and mixed for 10 minutes. The contents of the small mixer were then returned to the large mixer where the entire mixture was blended for another 10 minutes. A liquid mixture was added to the mixture of dry ingredients while mixing continued until a proper batch consistency was obtained as indicated by a reading of 0.25 on a spring-loaded soil testing penetrometer. The added liquid mixture comprised 780 ml of chilled water, 14 ml of triethylene glycol, and 14 ml. of a polyvinyl alcohol (PVA)/polyethylene glycol (PEG) mixture. The PVA/PEG mixture comprised 100 parts water, 2 parts PVA and 1 part PEG.

The wet mixture was then extruded to form the 400 cpsi honeycomb structure, dried, and gradually heated in a kiln according to the following schedule to form the cordierite structure: a one-hour soak at 420° C., a temperature increase of 60° C./hour to 1080° C., a one-hour soak at 1080° C., a temperature increase of 60° C./hour to 1350° C., a one-hour soak at 1350° C., a temperature increase of 60° C./hour to 1410° C., and finally a three-hour soak at 1410° C. The cordierite structure was then gradually cooled to room temperature.

The CTE of the cordierite structure from Example 1 was then tested according to the following procedure. A sample of the cordierite structure 1 inch in length and 154 inch $\times \frac{3}{8}$ inch in cross section was cut with the length of the honeycomb cells parallel to the length of the sample. The sample was placed in an alumina tube boat between the end of the boat and a push rod all at room temperature. This assembly was then placed in a model 15BC-1 dilatometer produced by the Orten Foundation, Westerville, Ohio. The sample and assembly was then heated at the rate of 3° C./minute from 20° C. to 800° C., and the percent linear expansion of the sample was measured by the dilatometer. The CTE of the sample from Example 1 is shown in Table 1.

EXAMPLE 2

A 400 cpsi honeycomb-shaped cordierite structure was made according to the same procedure set forth in Example 1 except that 2.5 g of germanium dioxide was used. The CTE of the cordierite structure from the Example 2 was tested according to the same procedure set forth in Example 1 and is also shown in Table 1.

EXAMPLE 3

400 cpsi honeycomb-shaped cordierite structure was mde according to the same procedure set forth in Example 1 except that 5.0 g of germanium dioxide was used. The CTE of the resulting cordierite structure was also measured according to the procedure set forth in Example 1 and is shown in Table 1.

EXAMPLE 4

A 400 cpsi honeycomb-shaped cordierite structure was made according to the same procedure set forth in Example 1 except that no germanium dioxide was used. The CTE of the resulting cordierite structure was measured according to the procedure set forth in Example 1 and is shown in Table 1.

EXAMPLE 5

A 400 cpsi honeycomb-shaped cordierite structure was made using the same starting materials used in Example 1 but on a larger scale. 19 lbs. of raw delaminated kaolin, 11 lbs. of calcined kaolin, 20 lbs of raw ceramic grade steatite talc, 20 lbs of calcined ceramic grade steatite talc, 15 lbs. of calcined alpha alumina, and 15 lbs of calcined kyanite were placed in a vee blender. The vee blender was equipped with an intensifier bar. The mixture was then blended in the vee blender for 30 minutes. The mixture was then transferred to a 35 gallon planetary action mixer where blending of the first mixture was continued using a standard open paddle mixing attachment. 0.1 lbs. of electronic grade germanium dioxide and 3 lbs. of methylcellulose were added to the mixture as the blending continued. 10 minutes after the germanium dioxide was added, 13.4 liters of a liquid mixture was added to the dry mixture while blending continued until a proper btch consistency was obtained as indicated by a reading of about 0.5 on a spring-loaded soil testing penetrometer. The added liquid mixture comprised 300 ml. of triethylene glycol, and 300 ml. of the PVA/PEG mixture having the composition set forth in Example 1 and chilled water as the remainder.

The wet mixture was removed from the planetary action mixer and extruded through a die into the 400 cpsi honeycomb shape. The honeycomb shape was then dried and fired according to the schedule set forth in Example 1 . The CTE of the cordierite structure from this Example 5 was measured according to the procedure set forth in Example 1 and is shown in Table 1.

EXAMPLE 6

A 400 cpsi honeycomb-shaped cordierite structure was prepared according to the procedure set forth in Example 5 except that no germanium dioxide was used and the entire dry mixed batch was passed first through a 100 mesh screen and then a 150 mesh screen. The CTE of the cordierite structure was measured according to the procedure set forth in Example 1 and is shown in Table 1.

TABLE 1

| Example | 1 | 2 | 3 | 4 | 5 | 6 |
|---|---|---|---|---|---|---|
| $GeO_2$ % | 0.05 | 0.10 | 0.20 | 0.00 | 0.10 | 0.00 |
| CTE $\times 10^6$ | 0.57 | 0.60 | 0.67 | 1.32 | 1.07 | 1.28 |

As can be seen from Table 1, incorporation of relatively small quantities of germanium dioxide into a cordierite composition significantly reduces the CTE of cordierite compositions. The reduction in CTE with the addition of such small quantities of germanium dioxide is surprising in view of the prior art teachings. Because the quantities necessary to reduce the CTE of cordierite to desired levels is so low, coriderite compositions for applications such as catalytic substrates can be made economically.

The foregoing description relates to certain preferred embodiments of the present invention, and changes and modifications may be made therein without departing from the spirit and scope of the invention as defined in the following claims.

We claim:

1. A ceramic composition comprising cordierite, the cordierite comprising from about 0.025 to about 1.5 percent, by weight, of germanium dioxide, whereby the resulting ceramic composition exhibits a CTE which is essentially isotropic and is less than $1.24 \times 10^{-6}$ in.-/in./°C.

2. A ceramic composition as defined in claim 1, wherein the cordierite is made according to a process comprising the step of heating a mixture comprising at least one calcined material so that the ceramic composition exhibits a greater degree of porosity than cordierite compositions without calcined material.

3. A ceramic composition as defined in claim 2, wherein the calcined material is selected from the group consisting of kaolin clay, talc, alumina and kyanite.

4. A ceramic composition as defined in claim 1, wherein the cordierite is made according to a process comprising the step of heating a mixture including talc, the talc comprising about 50 percent by weight of calcined talc and about 50 percent by weight of raw talc, whereby the ceramic composition exhibits a greater degree of porosity than cordierite compositions without calcined material.

5. A ceramic composition as defined in claim 1, wherein the germanium dioxide is substantially uniformly dispersed throughout the cordierite.

6. A ceramic composition made according to a process comprising the steps of:
   providing a substantially dry mixture comprising kaolin clay, talc, alumina, and kyanite;
   adding germanium dioxide to the substantially dry mixture in an amount from about 0.025 to about 1.5 percent by weight of the dry mixture;
   adding liquid to said substantially dry mixture to form a wet mixture;
   forming the wet mixture into a shape;
   drying the formed shape; and
   heating said formed and dried shape to a temperature at which sintering occurs and cordierite is formed, said cordierite exhibiting a CTE which is essentially isotropic and is less than $1.24 \times 10^{-6}$ in./in./°C.

7. A ceramic composition as defined in claim 6 wherein at least one of the group consisting of kaolin clay, talc, alumina, and kyanite comprises a portion which has been calcined so that the ceramic composition exhibits a greater degree of porosity than cordierite compositions without calcined material.

8. A ceramic composition as defined in claim 6 wherein the talc provided in the substantially dry mixture comprises calcined talc so that the ceramic composition exhibits a greater degree of porosity than cordierite compositions without calcined material.

9. A ceramic composition as defined in claim 6 wherein the talc provided in the substantially dry mixture comprises about 50 percent by weight of calcined talc and 50 percent by weight of raw talc so that the ceramic composition exhibits a greater degree of porosity than cordierite compositions without calcined material.

10. A ceramic composition as defined in claim 6, the process further comprising the step of blending said substantially dry mixture and the germanium dioxide until the germanium dioxide is substantially uniformly dispersed throughout said substantially dry mixture.

* * * * *